US011326516B2

(12) United States Patent
Barberger et al.

(10) Patent No.: US 11,326,516 B2
(45) Date of Patent: May 10, 2022

(54) REMOVAL OF CONTAMINANTS FROM AIR FOR USE IN AIRCRAFT ENGINES

(71) Applicant: PRATT & WHITNEY CANADA CORP., Longueuil (CA)

(72) Inventors: Jeremie Barberger, Montreal (CA); Christopher Gover, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/034,179

(22) Filed: Sep. 28, 2020

(65) Prior Publication Data

US 2021/0047965 A1 Feb. 18, 2021

Related U.S. Application Data

(63) Continuation-in-part of application No. 16/718,975, filed on Dec. 18, 2019, which is a continuation-in-part of application No. 16/541,491, filed on Aug. 15, 2019.

(51) Int. Cl.
*F02C 7/055* (2006.01)
*F02C 7/052* (2006.01)
*F02C 7/12* (2006.01)
*F02C 7/18* (2006.01)

(52) U.S. Cl.
CPC ............... *F02C 7/052* (2013.01); *F02C 7/12* (2013.01); *F02C 7/18* (2013.01)

(58) Field of Classification Search
CPC ..... F02C 7/052; F02C 7/12; F02C 7/18; F02C 9/18; B01D 39/2027; B01D 39/2041; B01D 39/2051; B01D 2201/62; B01D 2279/60
See application file for complete search history.

(56) References Cited

U.S. PATENT DOCUMENTS

| | | | |
|---|---|---|---|
| 1,771,639 A * | 7/1930 | Anders | B01D 46/00 55/329 |
| 4,158,449 A | 6/1979 | Sun et al. | |
| 5,402,636 A | 4/1995 | Mize et al. | |
| 7,137,777 B2 | 11/2006 | Fried et al. | |
| 7,326,031 B2 | 2/2008 | D'Neill et al. | |
| 7,634,984 B2 | 12/2009 | Stelzer et al. | |
| 8,961,634 B2 | 2/2015 | Boyce | |
| 9,492,780 B2 | 11/2016 | Taylor et al. | |
| 10,202,903 B2 | 2/2019 | Ahmadian et al. | |
| 2010/0000197 A1 * | 1/2010 | Snyder | F02K 1/822 60/39.5 |
| 2013/0086784 A1 * | 4/2013 | Bunker | F02C 7/12 29/402.03 |

(Continued)

*Primary Examiner* — Steven M Sutherland
(74) *Attorney, Agent, or Firm* — Norton Rose Fulbright Canada LLP

(57) ABSTRACT

A secondary air system for an aircraft engine comprises an air flow path communicating between a source of pressurized cooling air and an air consuming component. A filtering baffle is disposed in the air flow path upstream from the air consuming component. The filtering baffle has a monolithic body at least partly made of a cellular material, the cellular material including a non-stochastic lattice structure having a plurality of cells arranged in an ordered, repeating manner for trapping particulate matter contained in a flow of contaminated air.

20 Claims, 9 Drawing Sheets

(56) References Cited

U.S. PATENT DOCUMENTS

| | | | |
|---|---|---|---|
| 2016/0123154 A1* | 5/2016 | Manning | F01D 5/147 416/90 R |
| 2017/0234143 A1* | 8/2017 | Snyder | F01D 25/12 165/51 |

* cited by examiner

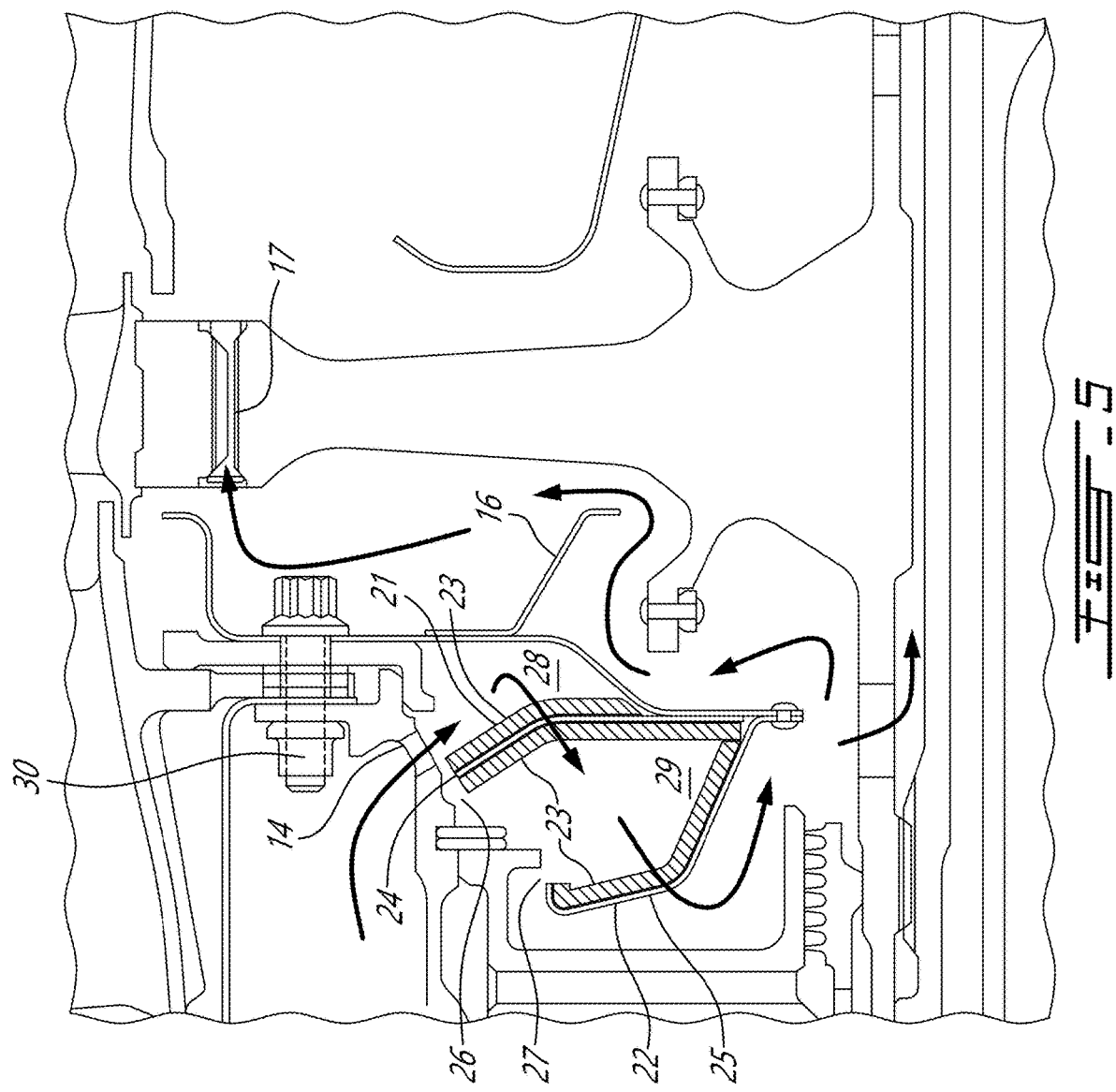

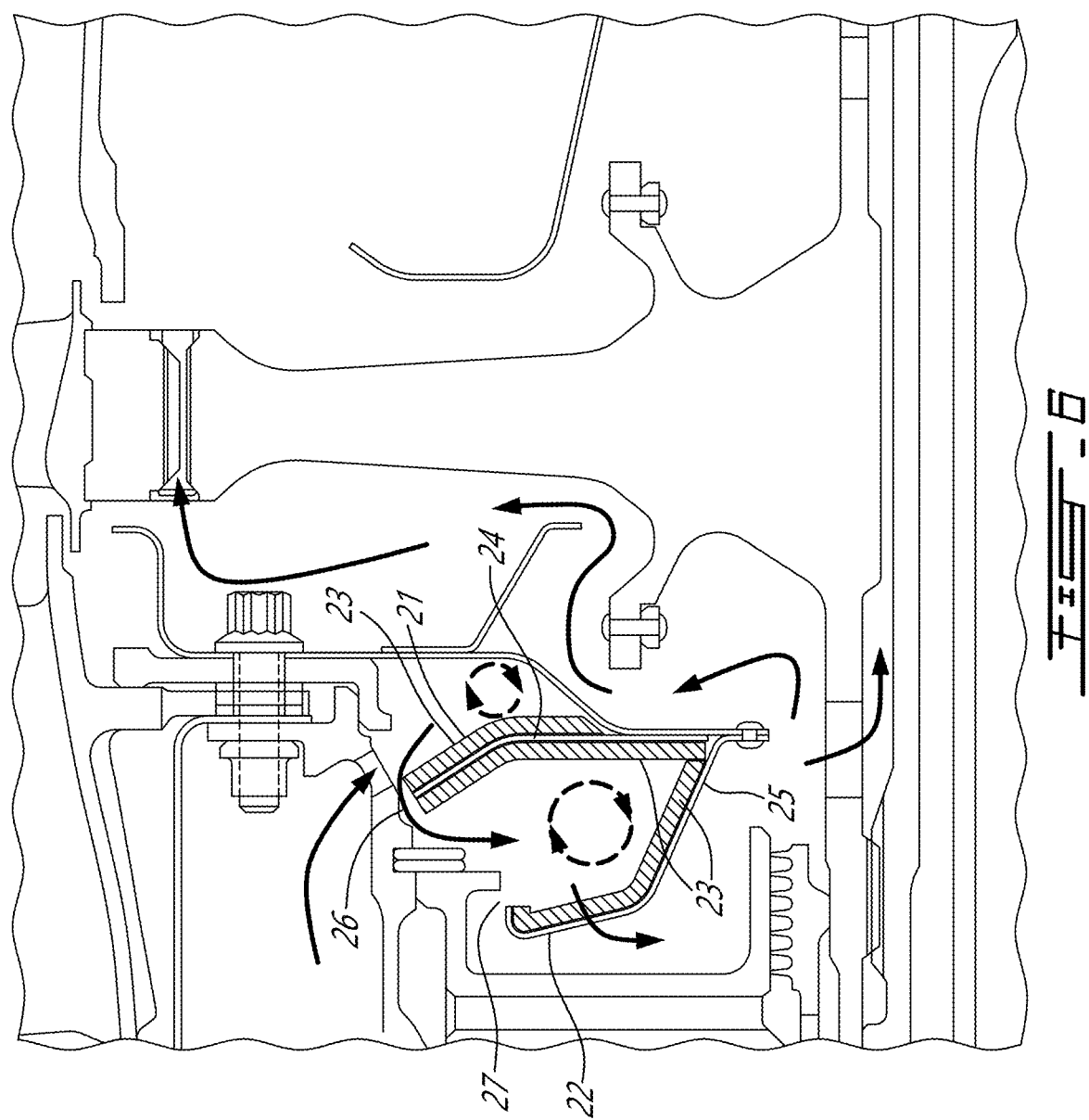

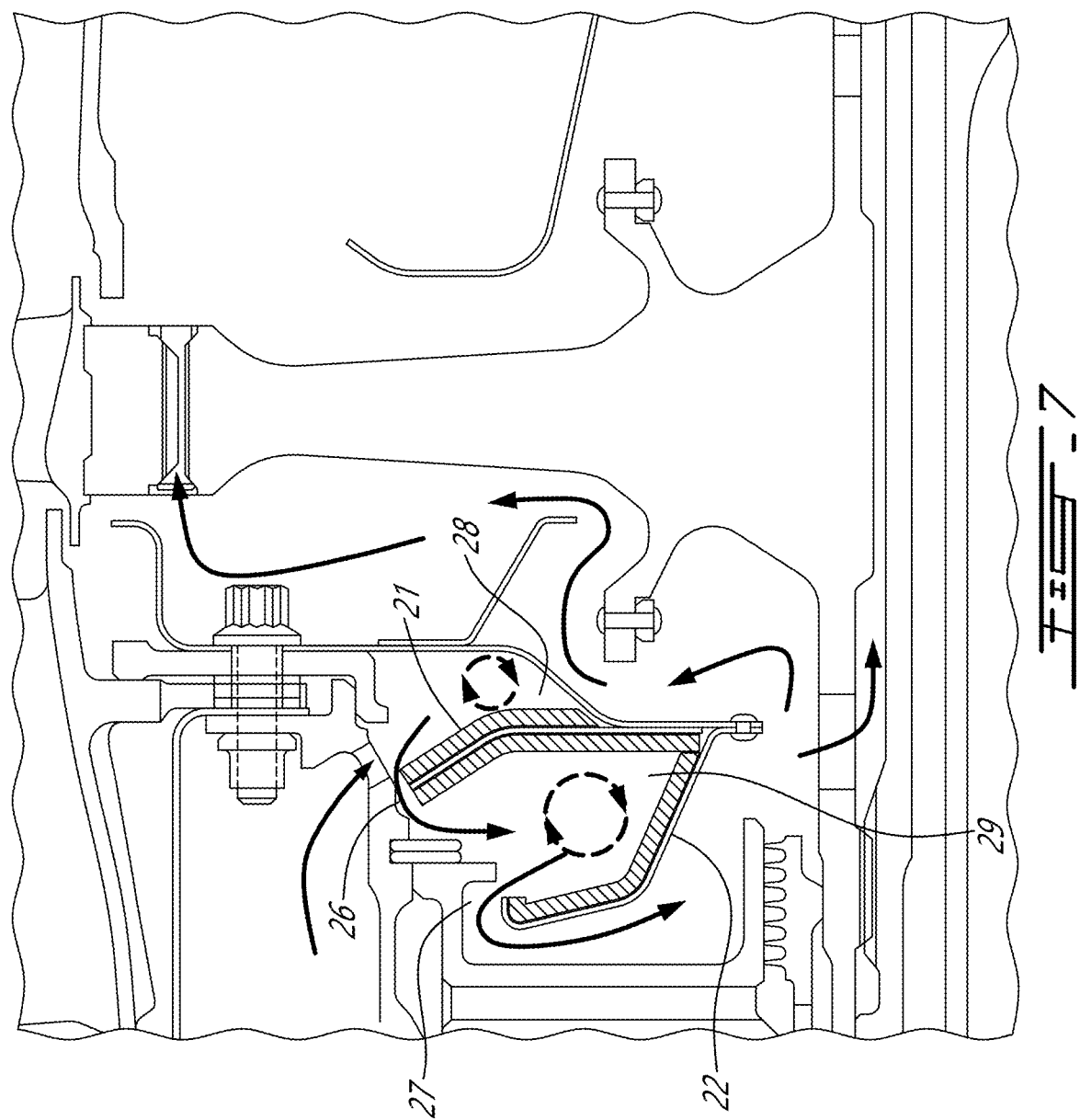

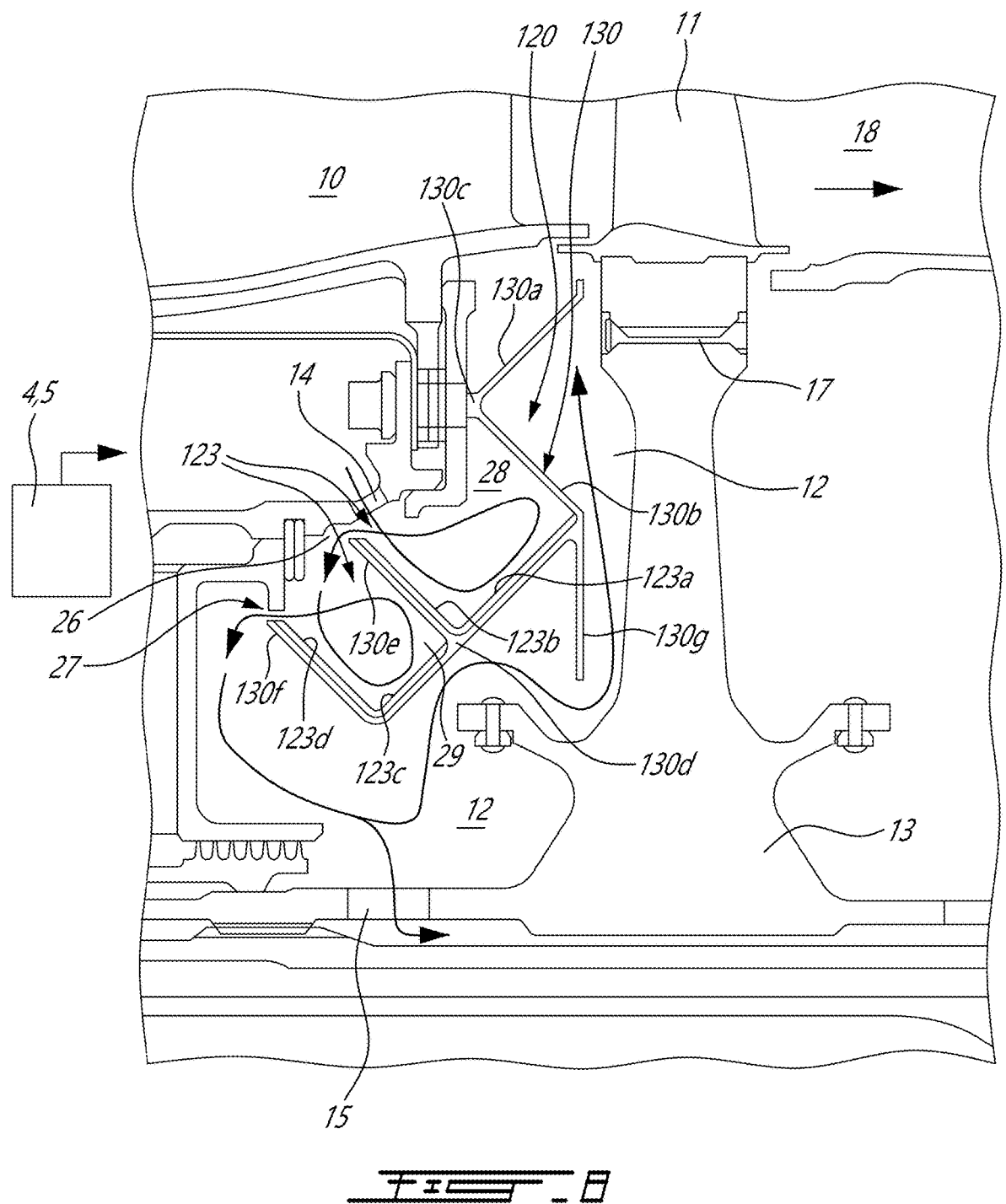

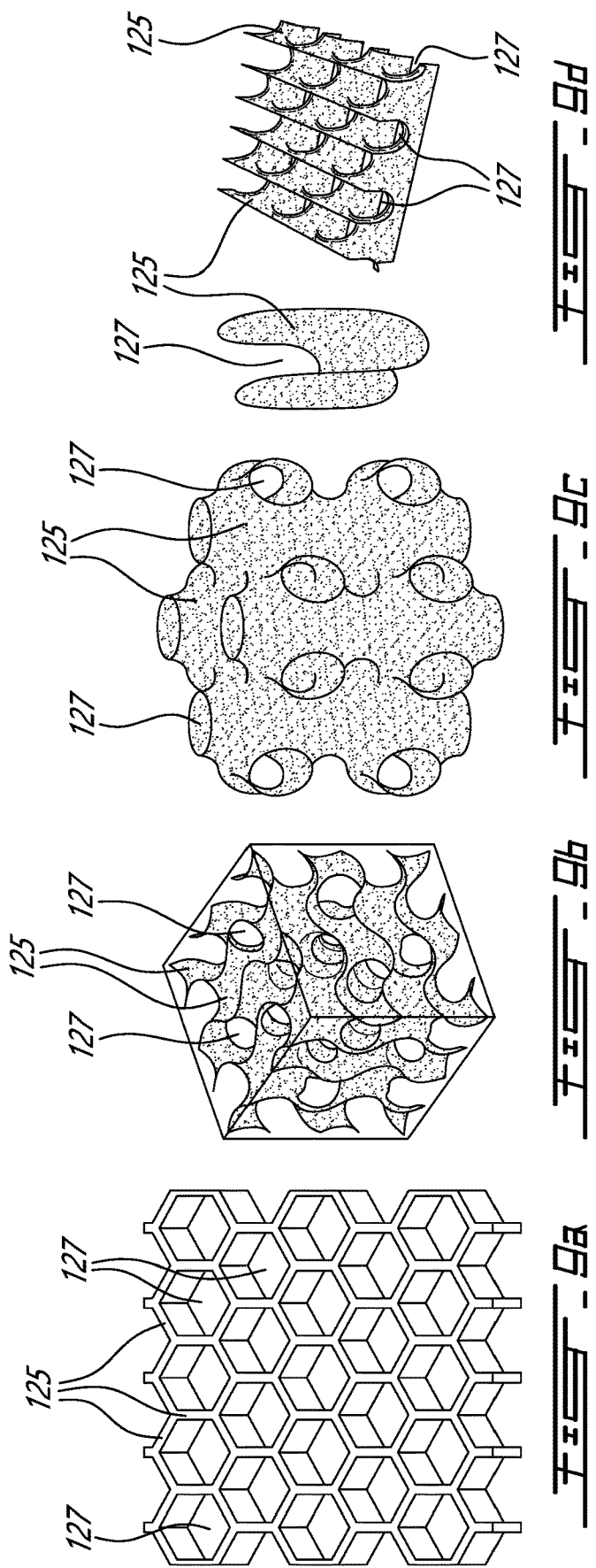

REMOVAL OF CONTAMINANTS FROM AIR FOR USE IN AIRCRAFT ENGINES

RELATED APPLICATION

This application is a continuation-in-part of U.S. application Ser. No. 16/718,975 filed on Dec. 18, 2019, which, in turn, claims priority on U.S. application Ser. No. 16/541,491 filed on Aug. 15, 2019. The entire content of both applications is incorporated herein by reference.

TECHNICAL FIELD

The application relates generally to a secondary air system (SAS) for aircraft engine and, more particularly, to an anti-contamination baffle with a particulate filter suitable for filtering SAS air.

BACKGROUND OF THE ART

Gas turbine engines operate at temperatures above which many materials are unable to withstand. A solution used in the aerospace industry to overcome the material heat limitation is the use of pressurized cooling air generated by the compressor section of the engine. The cooling air passes around and through hotter components removing heat from them and allowing continued reliable operation using materials and metal alloys in demanding high temperature exposure conditions. The generation of compressed air and conveying the cooling air consumes energy. To reduce the effect of cooling air consumption on overall engine performance and fuel efficiency, the quantity of cooling air is generally kept to the minimum possible using small orifices and narrow cooling passages.

During standard operation, the cooling passages are typically sufficient for the purposes required. However, during operation in high contamination environments where large quantities of fine particulate matter is suspended in the surrounding air, these narrow passages can become clogged reducing or even blocking cooling air flow completely. While larger particles can be separated by centrifugal force in the air inlet duct, engaging the inlet fan and exhausted through a bypass duct, smaller suspended particles and chemical contaminants may continue to be carried into the engine core with the air flow into the compressor, combustor and turbine sections. The result of air passages blocked by accumulation of small suspended particles and chemical contaminants can include overheating of cooled components which lead to engine removal or overhaul, seal replacement, spare part consumption, or part failure. Improvement is thus desirable.

SUMMARY

In one aspect, there is provided a secondary air system (SAS) for an aircraft engine comprising: an air flow path communicating between a core gas path of the aircraft engine and an air consuming component; and a filtering baffle disposed in the air flow path upstream from the air consuming component, the filtering baffle including a monolithic body at least partly made of a cellular material, the cellular material including a non-stochastic lattice structure having a plurality of cells arranged in an ordered, repeating manner for trapping particulate matter contained in a flow of contaminated air.

In another aspect, there is provided an aircraft engine comprising: a core gas path having an air inlet; a compressor fluidly connected to the air inlet of the core gas path; a turbine fluidly connected to the compressor via the core gas path; a secondary air system (SAS) having an air flow path communicating between the compressor and the turbine; and a filtering baffle including a monolithic body at least partly composed of a cellular metal having a non-stochastic lattice structure with an interconnected network of struts that cooperate to define a plurality of cells arranged in an ordered, repeating manner for trapping particulate matter contained in a flow of contaminated air.

In accordance with another aspect, there is provided a method for removing particulate matter from secondary air in an aircraft engine, the particulate matter being suspended in a core air flow passing through a core engine gas path; the method comprising: bleeding core air from the core air flow path to provide secondary air, trapping the particulate matter by filtering the secondary air through a filter disposed inside the aircraft engine upstream of an air consuming component, the filter having a non-stochastic lattice structure obtained using additive manufacturing.

Further details of these and other aspects of the subject matter of this application will be apparent from the detailed description included below and the drawings.

DESCRIPTION OF THE DRAWINGS

Reference is now made to the accompanying figures.

FIGS. 5, 6 and 7 are axial cross-sectional view of a turbine section of the engine and illustrating a secondary air filter showing the changes in air flow that occur when the filter medium becomes progressively blocked with suspended fine particulate matter and chemical contaminants, namely: when fully clear; with a blocked upstream filter panel; and with blocked downstream and upstream filter panels, respectively;

FIG. 8 is an axial cross-section of the engine and illustrating a monolithic filtering baffle with a non-stochastic lattice structure obtained using additive manufacturing; and FIGS. 9a, 9b, 9c and 9d illustrate various non-stochastic lattice geometries suitable for air filtering applications.

DETAILED DESCRIPTION

Figure 1:
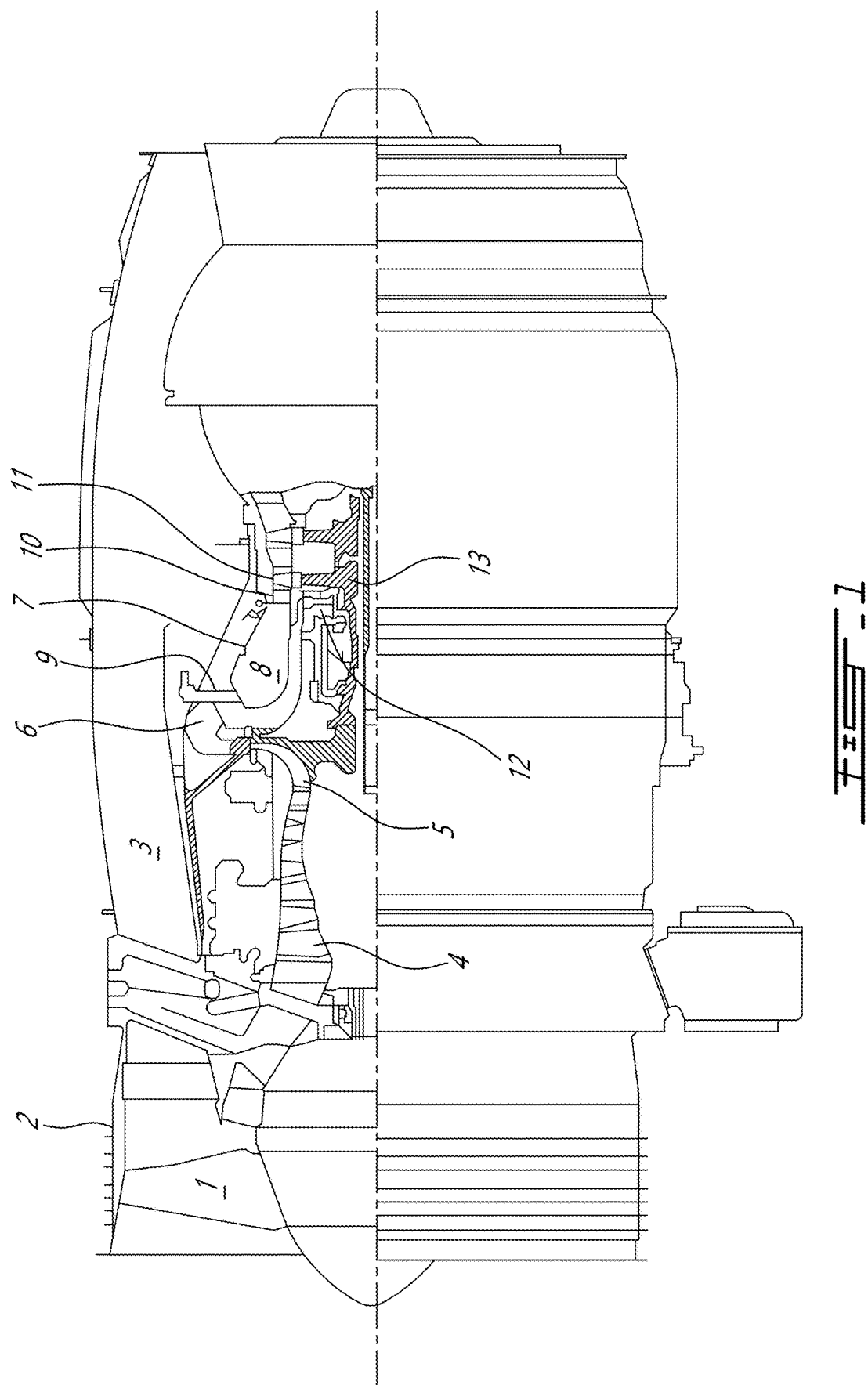
FIG. 1 is a schematic axial cross-sectional view of an example gas turbofan engine.

FIG. 1 shows an axial cross-section through an aircraft engine. According to the illustrated embodiment, the aircraft engine is a turbo-fan gas turbine engine. However, it is understood that the aircraft engine could adopt various other forms, such as a turboshaft, a turboprop or auxiliary power unit (APU). Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor section through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling the turbines to eventually mix with the hot gases from the combustor and pass over the nozzle guide vane 10 and turbine blades 11 before exiting the tail of the engine as exhaust.

The present description and drawings relate to the secondary air flow generated by the compressors 4-5 and conveyed to a secondary air system (SAS) for various engine functions and aircraft cabin pressure. Main functions of SAS are to provide cooling flow to hot engine components, to seal bearing chambers and to control bearing axial loads The examples shown in FIGS. 2-9 relate to cooling and/or sealing air. However, it is understood that the secondary air could be used for other purposes (e.g. providing pressurized air to the aircraft cabin or to other aircraft pneumatic equipment).

Figure 2:
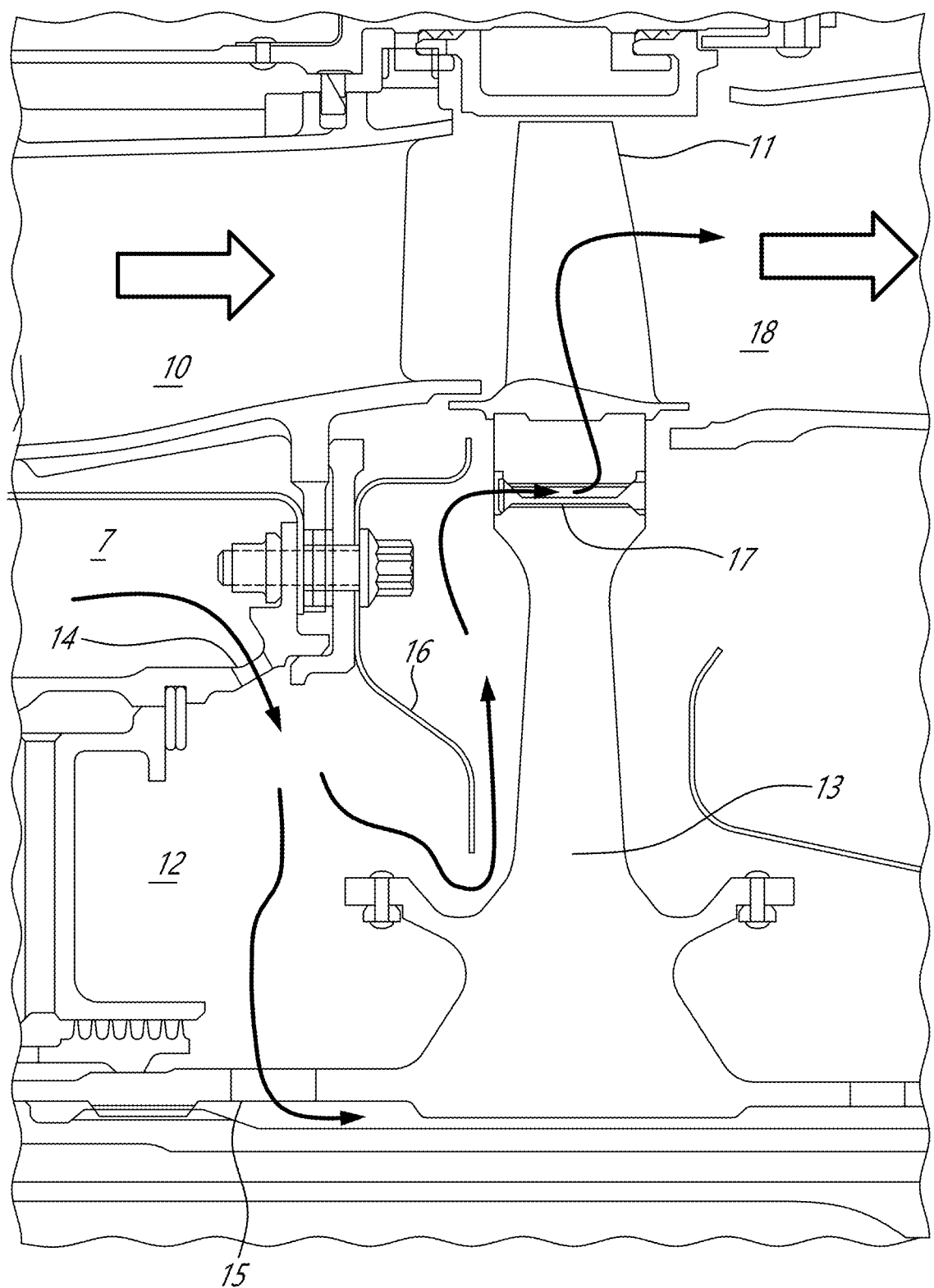
FIG. 2 is an axial cross-sectional view through the high pressure turbine section of the engine of FIG. 1, in particular showing the secondary air flow (e.g. cooling air) into the inter-stage cavity located between the nozzle guide vane and the high pressure turbine rotor.

FIG. 2 shows an axial cross-sectional view through the high pressure turbine section of the engine of FIG. 1. The inter-stage cavity 12 is located between the nozzle guide vane 10 and the high pressure turbine rotor 13. An array of turbine blades 11 is mounted on the circumference of the high pressure turbine rotor 13. As shown with arrows, core gas path air is bled from the compressor section (4-5, see FIG. 1) for use as secondary air in the secondary air systems. A portion of the secondary air is directed into the inter-stage cavity 12 through inlet openings 14. The arrows in FIG. 2 show a portion of the secondary air flow being directed to an outlet port 15 to supply air to downstream components. A portion of the secondary air flow is guided by an annular deflector or baffle 16 to impinge upon the turbine rotor 13 and then move radially outwardly toward the blade root air passage 17 to provide blade cooling air. The blade cooling air flows radially from the blade root air passage 17 into distribution and cooling channels within the interior of the turbine blade 11 to cool the turbine blade material before exiting and mixing into the hot gas path 18 from multiple vents near the trailing edge of the turbine blade 11.

Figure 3:
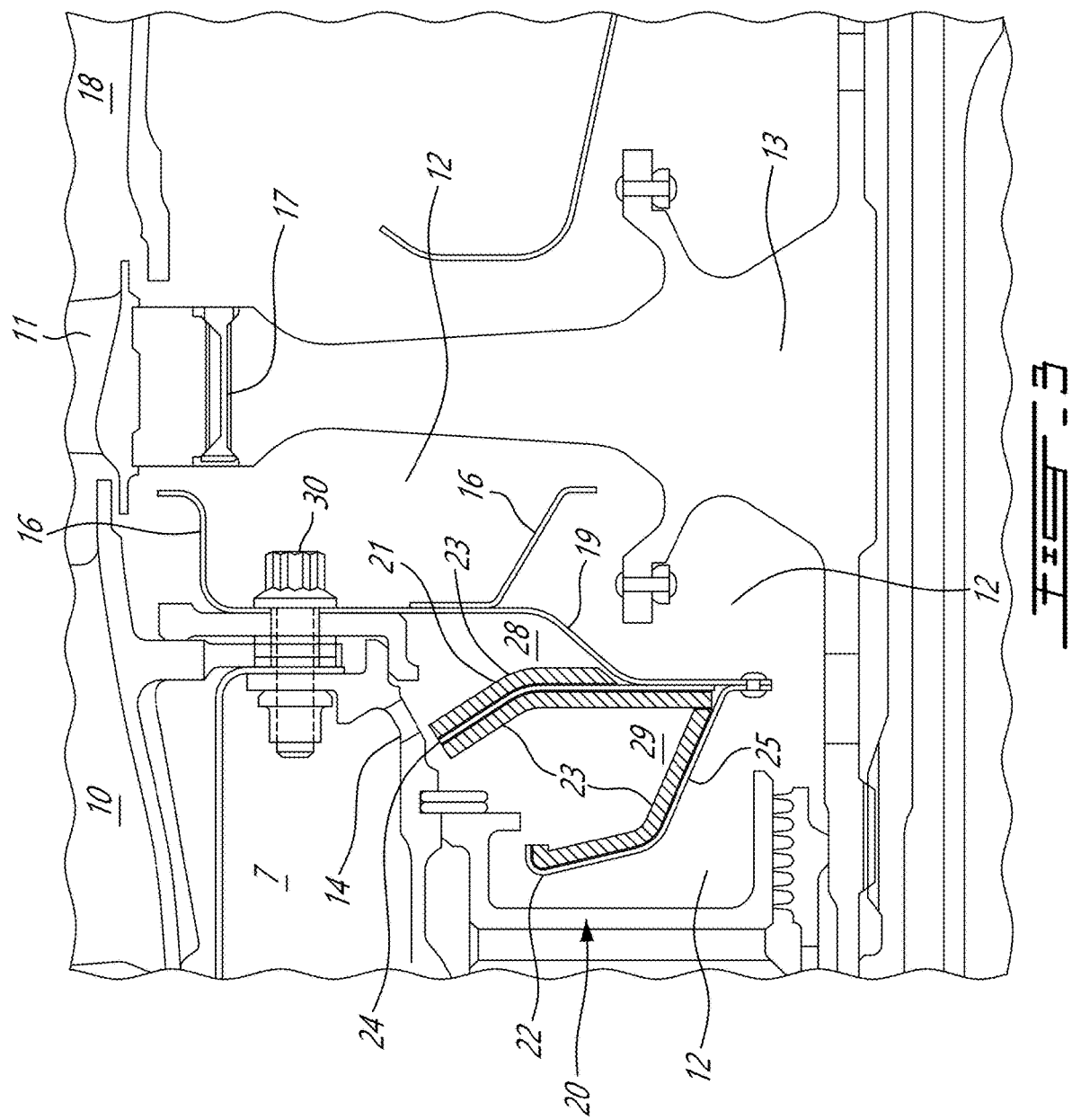
FIG. 3 is an axial cross-sectional view of a cooling air filter in accordance with the present description with two cantilevered filter panels positioned to intercept the air flow before entry into the narrow air flow channels of the turbine hub and turbine blades.
Figure 4:
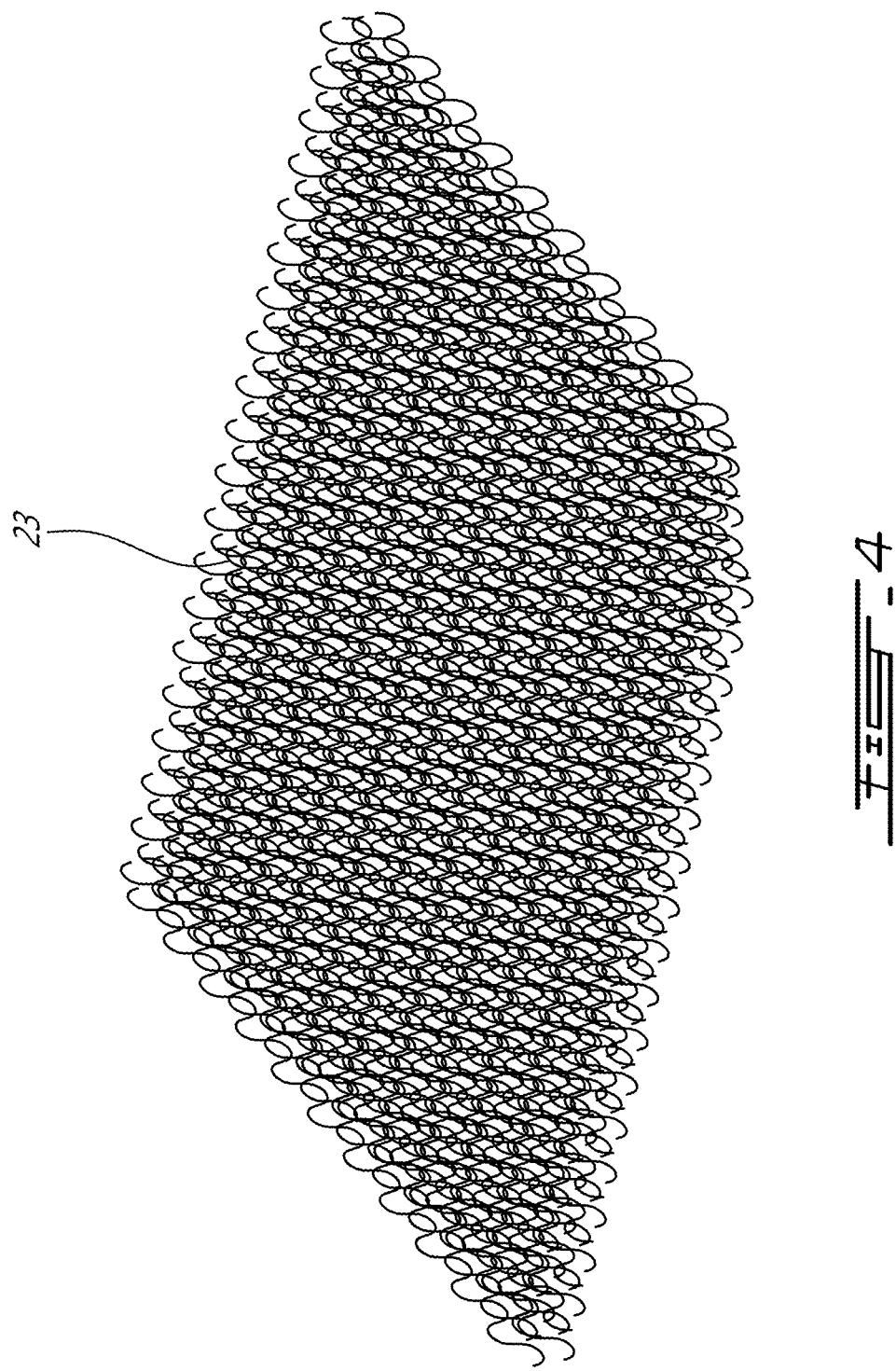
FIG. 4 is an isometric view of an example filter medium, being an undulating metal wire mesh.

FIG. 3 shows the addition of a support plate 19 to the deflector 16 on which a filter 20 is mounted to intercept and filter the secondary air flow before reaching sensitive engine components. In the example shown in FIGS. 3-7, the filter 20 has two cantilevered filter panels, namely an upstream panel 21 and a downstream panel 22 relative to a flow direction of the secondary air in the engine. FIG. 4 shows an example filter medium, being an undulating metal wire mesh 23. As seen in FIG. 3, the upstream filter panel 21 has a central perforated baffle plate 24 having two layers of mesh 23 covering both side surfaces of the baffle plate 24. The downstream filter panel 22 has a perforated baffle plate 25 having a single layer of mesh 23 covering an upstream surface only.

According to one embodiment, the support plate 19 and annular deflector 16 are not perforated. The support plate 19 and annular deflector 16 serve to direct air flow and provide a stationary structure to support the filter 20. Arrows in FIG. 5 show the cooling air flow passing from the inlet opening 14 through the upstream panel 21 (i.e.: through perforated baffle plate 24 and dual layers of mesh 23), through the downstream panel 22 (i.e.: through perforated baffle plate 25 and single layer of mesh 23), and then progressing past the annular deflector 16 towards the blade root air passage 17.

FIG. 6 shows cooling air flow once the upstream panel 21 of the filter 20 has become substantially blocked with accumulated particles or chemical contaminants. When the mesh 23 and perforated baffle plate 24 are blocked, cooling air flow is directed to bypass the upstream panel 21 via the upstream filter bypass passage 26. Since the downstream panel 22 is not blocked in FIG. 6, the cooling air flow passes through the mesh 23 and the perforated baffle plate 25 of the downstream panel 22.

FIG. 7 shows cooling air flow when both the upstream panel 21 and downstream panel 22 of the filter 20 have become substantially blocked. When the mesh 23 and perforated baffle plate 25 are blocked, cooling air flow is directed to bypass the downstream panel 22 via the downstream filter bypass passage 27. Since both the upstream panel 21 and the downstream panel 22 are blocked in FIG. 7, the cooling air flow does not pass through the filter 20. However due to the tortuous route of air flow required to pass the upstream panel 21 and downstream panel 22, vortex air currents are formed in the air flow contained within the upstream and downstream particulate traps 28, 29. Due to their mass, solid particles within the air flow will tend to be expelled outwardly by the vortex patterned air flow or toroidal flow within the upstream and downstream particulate traps 28, 29. Particles can be trapped by interaction with the rough surface and voids of the mesh 23 covering the exterior of the panels 21, 22.

Referring back to FIG. 3, the gas turbine engine has an air flow path communicating between a source of pressurized cooling air (compressors 4, 5) and the turbine rotor 13 with air cooled blades 11. In the example illustrated, the air flow path passes through the inter-stage cavity 12, commencing with circumferentially spaced-apart inlet openings 14 and including the blade root air passage 17 in each turbine blade 11. The filter 20 is disposed on the support plate 19 removably mounted with a bolt 30 to a stationary wall of the air flow path upstream from the turbine rotor 13. The filter 20 includes perforated baffle plates 24, 25 and the surfaces support layers of mesh 23. As mentioned herein above, the mesh 23 and perforated baffle plates 24, 25 include openings of a size selected for capturing suspended particles from the cooling air flow and/or a filter surface material for binding with chemical contaminants. The filter surface material can include a catalyst, a reactive binder, an electrostatic charge, or an adhesive. In the event that the mesh 23 and perforated baffle plates 24, 25 become blocked with particles or accumulated chemical contaminants, the upstream panel 21 and downstream panel 22 are spaced from the outer wall of the inter-stage cavity 12 by an upstream filter bypass passage 26 and a downstream filter bypass passage 27 respectively (see FIGS. 5-7). FIGS. 5-7 show the progressive changes in cooling air flow that occur when the filter medium mesh 23 becomes progressively blocked with suspended fine particulate matter and chemical contaminants. FIG. 5 shows the cantilevered upstream and downstream panels 21, 22 when fully clear with air flow passing through both panels 21, 22. FIG. 6 shows the air flow when the upstream filter panel 21 is blocked. FIG. 7 shows when both downstream and upstream filter panels 21, 22 are blocked and the cooling air pass through the upstream and downstream filter bypass passages 26, 27. According to some embodiments, the bypass passages 26, 27 are disposed between a radially outer edge of the cantilevered upstream and downstream panels 21, 22 and the interior wall of the air flow path.

As mentioned herein above, the filter 20 extends from stationary support plate 19. The annular deflector 16 may be used with bolt 30 to secure the filter 20 extending transverse to the direction of air flow (see arrows). As seen in FIG. 5, the air flow abruptly changes direction between the inlet opening 14 and passing through the upstream panel 21 of the filter 20. Particles in the air flow will tend to be separated from the air by centrifugal force when air flow changes direction. Accordingly as seen in FIG. 3, an upstream particulate trap 28 is defined between the upstream panel 21 of the filter 20 and the stationary support plate 19. A downstream particulate trap 29 is defined between at the cantilevered panels of the filter 20, namely between the upstream panel 21 and the downstream panel 22.

In the example illustrated, the filter 20 is disposed in the inter-stage disc cavity 12 between the nozzle guide vane 10 and the turbine rotor 13. According to one aspect, the filter 20 includes a pair of perforated baffle plates 24, 25 and a filter medium mesh 23 mounted to each perforated baffle plate 24, 25. An example of a filtering mesh 23 is shown in FIG. 4 in the form of an undulating metal wire chain linkage. However the filtering mesh 23 can also be selected from: a woven mesh; a non-woven fabric; a knitted net; a perforated sheet; a welded mesh; or an open pore sintered particle layer. The material of the filtering mesh 23 may include: a metal wire; a carbon fibre; a plastic fibre; a ceramic material; or a plastic material.

The above described exemplary filter 20 provides a method for removing fine particulate matter and chemical contaminants from secondary air in a gas turbine engine. The fine particulate matter and chemical contaminants are suspended in a secondary air flow passing through an airflow path in flow communication with turbine components, such as the turbine rotor 13 and blades 11. The fine particulate matter and chemical contaminants are trapped by filtering at least a first portion of the cooling air through the filter 20 disposed in the inter-stage cavity 12. A second portion of the cooling air may bypass the filter 20 via an upstream filter bypass passage 26 and/or a downstream filter bypass passage 27.

According to the illustrated embodiment, the filter 20 includes two cantilevered panels 21, 22 that define an annular channel or downstream particulate trap 29. However, more or less panels could be provided. The filtering mesh 23 is provided on both the upstream panel 21 and downstream panel 22. As seen in FIGS. 5-7, directing the secondary air into the inter-stage cavity 12, including the annular channel or downstream particulate trap 29, creates swirling the cooling air in a toroid vortex pattern (dashed arrows) generated within the particulate traps 28, 29.

Dashed arrow lines show swirling of the cooling air in a vortex generated within the upstream particulate trap 28 and within the downstream particulate trap 29. When the upstream cantilevered panel 21 of the filter 20 is substantially blocked by the fine particulate matter and the chemical contaminants, as seen in FIG. 6, cooling air is conveyed downstream via the upstream filter bypass passage 26 toward the downstream cantilevered panel 22 of the filter 20. A coating may be applied to the mesh 23 and perforated baffle plates 24, 25 of the filter 20. The coating may be a material adapted to bind with the chemical contaminants found in the cooling air flow. The mesh material may be made of or coated with a material which chemically interacts with chemical contaminants present in the secondary air.

FIG. 8 illustrates a further embodiment of an annular filtering baffle 120 suitable for use in a secondary air system of a gas turbine aircraft engine. According to this embodiment, the filtering medium 123 is an integral part of the baffle itself as opposed to an additional part to be attached thereto. That is the filtering medium 123 is not an add-on component but is rather manufactured together with the baffle as a unitary structure, thereby eliminating the need for additional manufacturing steps to attach a separate filtering mesh (as for instance shown in FIG. 4) to the body of a separately manufactured baffle plate.

According to one aspect, the filtering baffle 120 is at least partly made of a porous/cellular material (e.g. cellular metals) having a cellular structure that forms void spaces referred to as cells or pores. The cells or pores are shaped and sized to trap the particulate matter contained in the contaminated air. According to a further aspect, the filtering baffle is of unitary (monolithic or unibody) construction with a non-stochastic lattice (NSL) cellular structure 123a, 123b, 123c and 123d formed on a side of the baffle 120 facing the inlet openings 14 (i.e. the upstream side of the filtering baffle generally facing the incoming flow of contaminated air). As exemplified in FIG. 8, the NSL structure 123a, 123b, 123c and 123d is provided over selected surfaces of the baffle 120 to act as a filter medium to trap particle matters contained in the incoming flow of contaminated air, thereby reducing suspended particle count prior to the air reaching contaminant sensitive engine components. While the NSL structure 123a, 123b, 123c and 123d is shown as being applied to only a portion of the front or upstream side of the baffle 120, it is understood that the NSL structure 123a, 123b, 123c and 123d could be provided over the entire body of the baffle 120. For instance, the entirety of the unitary body of the filtering baffle 120 could be formed as an NSL structure. Also, as will be seen hereinafter, different NSL structures could be provided in different areas or zones of the baffle 120 to tailor the filtering action to local flow characteristics and air contamination conditions. For instance, the cell size and cell geometry of the NSL structure 123a could be different from those of the NSL structure 123b. Alternatively, the NSL structure 123a, 123b, 123c and 123d could be provided as one and the same NSL structure with identical geometrical characteristics. The person skilled in the art will appreciate that various combinations are possible.

Generally, the NSL filtering structure is provided where the contaminated air will come in contact with the filtering baffle 120. However, it is understood that such lattice structure can be omitted in areas that are likely to be damaged by the incoming flow of air. In these areas, a solid/non-cellular material structure can instead be used. For instance, areas which are in direct alignment with a high velocity flow of contaminated air, such as the portion of the baffle 120 which is in direct alignment with the inlet openings 14 could in some applications have a solid/non-cellular material structure instead of a lattice structure. In other words, the filtering baffle can have a hybrid composition with parts thereof having non-stochastic lattice structures and other parts with solid material composition.

As can be appreciated from FIGS. 9a, 9b, 9c and 9d, the NSL structure 123a, 123b, 123c and 123d of the filtering baffle 120 includes an interconnected network of "struts" or land of material 125 that cooperate to define a plurality of ports or cells 127 arranged in an ordered, repeating manner. That is the NSL structure 123a, 123b, 123c and 123d shown in FIG. 8 is a periodic cellular solid with ordered cells 127 which can be categorized by their shapes and sizes. In contrast, a stochastic lattice structure has random variations in the shape and size of the cells. NSL structures do not have such random variation of cell sizes and shapes. NSL structures do not have imperfections such as random variation of cell sizes and shapes. NSL structures thus exhibit better mechanical properties in comparison to stochastic (random) cellular structures. Also, the filtering performance of the filter medium can be better predicated.

The NSL structure can adopt various cell geometries according to the desired filter properties, such as filtration capacity, particle retention, structural integrity, corrosion resistance, pressure drop across the NSL structure, etc. Possible variations of the NSL structure 123a, 123b, 123c and 123d include the following shapes: honeycomb (FIG. 9a), Gyroid (FIG. 9b), Schwarz (FIG. 9c) and Scherk (FIG. 9d) among others. The NSL structure can be designed/modelized using known CAD software to be tailored to the specific environment in which is it intended to be used.

It is contemplated to use additive manufacturing technologies, such as Selective Laser Melting (SLM), Laser Engineered Net Shaping (LENS), Electron Beam Melting (EBM) to name a few, to fabricate the filtering baffle 120 with its integrated non-stochastic lattice filtering structure 123a, 123b, 123c and 123d. Using CAD software and additive manufacturing technologies, it is possible to adjust the size and the shape of the cells according to the specific parameters (including the size and shape of the expected contaminants to be extracted from the contaminated air) of virtually any aircraft engine air filtering applications. For instance, the exemplified monolithic filtering baffle 120 shown in FIG. 8 could be manufactured on a SLM additive manufacturing machine. The profile/shape of the baffle 120 can be designed to accommodate the various constrains that come with the selected additive manufacturing technology. For instance, with the SLM technology, there are limitations on the angle that can be created between adjoining surfaces and overhang surfaces to be able to build them without a temporary support structure. Accordingly, the shape/geometry of the baffle 120 shown in FIG. 8 can be designed to accommodate these limitations and allow fabrication without such temporary support. More particularly, the angles between the surfaces of the baffle can be selected to achieve symmetry without using angles greater than the material maximum overhang limit and so that the surfaces meet at a point rather than meeting at a flat or horizontal surface. The baffle profile shown in FIG. 8 allows to "print" the baffle without any temporary support, resulting in a significant decrease in post-printing operations (i.e. no support to be removed/disassembled from the 3D printed filtering baffle).

In one aspect, filter fabrication via additive manufacturing with non-stochastic lattice structures allows tailoring each filtering baffle to its intended environment of use. Furthermore, different NSL filtering structures 123a, 123b, 123c and 123d could be provided at different locations on a same filtering baffle 120 to adjust to the local flow and air contamination conditions. For instance, by varying the size and/or the geometry of the cells 127 over the surface of the baffle 120, higher filtration could be provided in areas where the baffle 120 is more exposed to the contaminated air and less filtration could be provided in less critical areas.

As exemplified by the embodiment illustrated in FIG. 8, the filtering baffle 120 can contain a non-porous/solid baseline structure or substrate 130 with the NSL structure 123a, 123b, 123c and 123d applied as an extra filtering layer(s) on at least some of the upstream facing surface of the baffle substrate 130. It is understood that the baffle substrate 130 and the NSL structure 123a, 123b, 123c and 123d can be manufactured as part of a same additive manufacturing process even though they have a different morphology. According to the illustrated embodiment, the solid/non-porous substrate 130 comprises first and second diverging baffle portions 130a and 130b extending rearwardly from a front web portion 130c adapted to be removably attached, such as by bolting, to a static structure of the engine. A third baffle portion 130d extends forwardly substantially at a right angle from a distal end of the second baffle portion 130b. A fourth baffle portion 130e projects generally at right angle from a front or upstream surface of the third baffle portion 130d in close proximity to a wall of cavity 12 to form a first constricted passageway 26 for the contaminated air discharged into cavity 12 via openings 14. The second baffle portion 130b, the third baffle portion 130d, and the fourth baffle portion 130e define a first trap 28 into which the contaminated air is discharged from openings 14. The second baffle portion 130b and the fourth baffle portion 1303 form the side walls of the first trap while the third baffle portion 130d forms the bottom surface thereof. A fifth baffle portion 130f extends from the distal end of the third baffle portion 130d generally in parallel to the fourth baffle portion 130e. The fifth baffle portion 130f extends in close proximity to a wall of cavity 12, thereby forming a second constricted passageway 27 for the contaminated air. The third, fourth and fifth baffle portions 130d, 130e and 130f define a second trap 29 for receiving the contaminated air from the first trap 28 via the first passageway 26. The second trap is separated from the first trap 28 by the fourth baffle portion 130e which act has a partition or intermediate wall therebetween. The third baffle portion 130d forms the bottom surface of the second trap 29 and the fifth baffle portion 130f forms the second side wall thereof. The baffle substrate 130 comprises on a downstream side thereof a further baffle portion 130g depending radially inwardly from a junction between the second baffle portion 130b and the third baffle portion 130d.

According to the illustrated embodiment, NSL filtering structure 123a, 123c is built by layered deposition onto the upstream facing surface of the third baffle portion 130d to provide a filtering surface in the bottom of the first and second traps 28, 29. NSL filtering structures 123b, 123d are also respectively built on the fourth and fifth baffle portions 130e and 130f over an inwardly trap facing side thereof. According to the illustrated embodiment, no NSL filtering structure is formed on the back (i.e. downstream) side of the baffle portions 130e and 130f. Accordingly, the filtering medium is only provided on two of the three surfaces bounding each of the trap 28, 29. It is understood that other configurations are contemplated as well.

As mentioned herein before, the various sections of the NSL filtering structure 123a, 123b, 123c and 123d can have the same cellular topology or be of different sizes and/or geometries. The cells 127 of the NSL filtering structure 123a, 123b, 123c and 123d are configured to trap the particulate matter contained in the air has the air flows through the first and second traps as depicted by the flow arrows in FIG. 8. In one aspect, the NSL structure 123a and 123b of the first trap 28 could be configured to trap coarse particles whereas the NSL filtering structure 123c and 123d of the second trap 29 can be configured to trap fine particles. That is the NSL filtering structure on the inner surface of the first trap 28 and can have a different filtering grade than that of the NSL filtering structure on the inner surface of the second trap 29. Also the material density that is the size of the cells 127 can vary across the thickness of any of the NSL filter structures. For instance, each NSL filtering structure 123a, 123b, 123c and 123d could be built by successive layer deposition such that the size of the cells 127 thereof vary in a thickness wise direction that is in a direction normal to the baffle substrate 130 upon which the NSL structure is being layered. According to one aspect, the cells 127 could have a smaller size next to the baffle substrate 130 than at an outer layer of the NSL filtering structure.

According to the illustrated embodiment, the baffle substrate is solid so the air is not allowed to flow through the filtering baffle 120. However, it is understood that the baffle substrate 130 could be porous. For instance, the baffle substrate could have a cellular morphology similar to the NSL filtering structure 123a, 123b, 123c and 123d and, thus, according to some embodiments, the air may be allowed to flow through at least selected parts of the filtering baffle 120.

Also, while the baffle substrate 130 and the NSL filtering structure 123a, 123b, 123c have been described as one and the same additive manufacturing product, it is understood that the NSL filtering structure 123a, 123b, 123c and 123d and 123d could be formed by additive manufacturing directly on a pre-formed baffle substrate or baseline structure. That is the NSL filtering structure could be applied over an existing baffle body obtained by a same or different manufacturing process.

The filtering baffle 120 can be made of various materials depending on the operating conditions prevailing in the region of the engine in which the filtering baffle 120 is intended to be used. For applications in the turbine section as illustrated in FIG. 8, it is contemplated to use high temperature resistant materials, such as metals. Plastic or composite materials could be used in less thermally solicited engine environment.

In view of the foregoing, it can be appreciated that additive manufacturing can be used to manufacture a non-stochastic lattice structure within a gas turbine engine for the purposes of removal of contamination from air passing through it. The size and shape of the cells can be adjusted throughout the NSL structure by having a variable density of material (i.e. a variable size of pores) such that the filtration rate can be better controlled. For instance, smaller holes can be provided closer to the surface of the baffle substrate so that these holes fill up sooner, thereby providing for a gradual and more uniform loading of the cell structure as compared to a conventional filtering mesh with random pore distribution.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A secondary air system (SAS) for an aircraft engine comprising:
an air flow path communicating between a core gas path of the aircraft engine and an air consuming component; and
a filtering baffle disposed in the air flow path upstream from the air consuming component, the filtering baffle including a monolithic body at least partly made of a cellular material, the cellular material including a non-stochastic lattice structure having a plurality of cells arranged in an ordered, repeating manner for trapping particulate matter contained in a flow of contaminated air, wherein the non-stochastic lattice structure includes first and second non-stochastic lattice structures, said first and second non-stochastic lattice structures having different cell geometries and/or cell sizes.

2. The secondary air system according to claim 1, wherein the filtering baffle defines first and second traps on an upstream side thereof relative to the flow of contaminated air, the first and second traps fluidly interconnected by a first constricted passageway, and wherein the non-stochastic lattice structure is provided inside said first and second traps.

3. The secondary air system according to claim 2, wherein the first and second traps are bounded by bottom and side surfaces forming part of said monolithic body of the filtering baffle, and wherein the non-stochastic lattice structure is provided on at least part of said bottom and side surfaces.

4. The secondary air system according to claim 3, wherein the non-stochastic lattice structure is provided on the bottom surfaces of the first and second traps and on one of the side surfaces of each of the first and second traps.

5. The secondary air system according to claim 4, wherein the first and second traps are separated by a baffle wall, and wherein the non-stochastic lattice structure is provided on one side of said baffle wall, said one side facing inwardly of said first trap.

6. The secondary air system according to claim 2, wherein the non-stochastic lattice structure comprises a first non-stochastic lattice structure in the first trap and a second non-stochastic lattice structure in the second trap, and wherein the first and second non-stochastic lattice structures offer different particle filtering grades.

7. The secondary air system according to claim 2, wherein the filtering baffle is removably mounted in an inter-stage cavity located between a stage of turbine vanes and a turbine rotor, and wherein the second trap is fluidly connected to a portion of the inter-stage cavity downstream of the filtering baffle via a second constricted passageway.

8. The secondary air system according to claim 1 wherein the monolithic body of the filtering baffle comprises a non-porous baffle substrate, the non-stochastic lattice structure being layered on an upstream surface of the non-porous baffle substrate.

9. The secondary air system according to claim 8, wherein a size of the cells of the non-stochastic lattice structure varies across a thickness of the non-stochastic lattice structure, the cells closer to the non-porous baffle substrate being smaller that the cells at an outer layer of the non-stochastic lattice structure.

10. The secondary air system according to claim 8, wherein the cellular material has a variable density of cells.

11. The secondary air system according to claim 1 wherein the non-stochastic lattice structure has a cell geometry selected among the group consisting of: Honeycomb, Gyroid, Schwarz and Scherk.

12. An aircraft engine comprising:
a core gas path having an air inlet;
a compressor fluidly connected to the air inlet of the core gas path;
a turbine fluidly connected to the compressor via the core gas path;
a secondary air system (SAS) having an air flow path communicating between the compressor and the turbine; and
a filtering baffle including a monolithic body at least partly composed of a cellular metal having a non-stochastic lattice structure with an interconnected network of struts that cooperate to define a plurality of cells arranged in an ordered, repeating manner for trapping particulate matter contained in a flow of contaminated air, wherein the non-stochastic lattice structure has different cell sizes in different areas of the filtering baffle to provide for variable filtering capability over the surface of the filtering baffle.

13. The aircraft engine according to claim 12, wherein the size of the cells varies across a thickness of the cellular metal.

14. The aircraft engine according to claim 12, wherein the filtering baffle further comprises a solid metal baffle substrate, the non-stochastic lattice structure being built upon an upstream surface of said solid metal baffle substrate.

15. The aircraft engine according to claim 14, wherein solid metal baffle substrate defines a first particle trap and a second particle trap, the second particle trap in fluid communication with said first particle trap.

16. The aircraft engine according to claim 15, wherein the non-stochastic lattice structure is disposed in said first and second particle traps.

17. The aircraft engine according to claim 16, wherein the non-stochastic lattice structure is provided on a bottom surface and a side surface of each of said first and second particle traps.

18. The aircraft engine according to claim 15, wherein the second particle trap is fluidly connected to the first particle trap via a constricted passageway defined between the filtering baffle an a wall of the air flow path.

19. A secondary air system (SAS) for an aircraft engine comprising:
an air flow path communicating between a core gas path of the aircraft engine and an air consuming component; and
a filtering baffle disposed in the air flow path upstream from the air consuming component, the filtering baffle including a monolithic body at least partly made of a cellular material, the cellular material including a non-stochastic lattice structure having a plurality of cells arranged in an ordered, repeating manner for trapping particulate matter contained in a flow of contaminated air, wherein the filtering baffle defines first and second traps on an upstream side thereof relative to the flow of contaminated air, the first and second traps fluidly interconnected by a first constricted passageway, and wherein the non-stochastic lattice structure is provided inside said first and second traps.

20. An aircraft engine comprising:
a core gas path having an air inlet;
a compressor fluidly connected to the air inlet of the core gas path;
a turbine fluidly connected to the compressor via the core gas path;
a secondary air system (SAS) having an air flow path communicating between the compressor and the turbine; and
a filtering baffle including a monolithic body at least partly composed of a cellular metal having a non-stochastic lattice structure with an interconnected network of struts that cooperate to define a plurality of cells arranged in an ordered, repeating manner for trapping particulate matter contained in a flow of contaminated air, wherein the filtering baffle further comprises a solid metal baffle substrate, the non-stochastic lattice structure being built upon an upstream surface of said solid metal baffle substrate, and wherein solid metal baffle substrate defines a first particle trap and a second particle trap, the second particle trap in fluid communication with said first particle trap.

* * * * *